(12) United States Patent
McGinnis

(10) Patent No.: US 7,177,989 B1
(45) Date of Patent: Feb. 13, 2007

(54) RETRY OF A DEVICE READ TRANSACTION

(75) Inventor: Darrell S. McGinnis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 10/749,924

(22) Filed: Dec. 31, 2003

(51) Int. Cl.
*G06F 12/06* (2006.01)

(52) U.S. Cl. .................... 711/151; 711/145

(58) Field of Classification Search ............... 711/145, 711/144, 152, 151, 156
See application file for complete search history.

(56) References Cited

U.S. PATENT DOCUMENTS 5,570,297 A * 10/1996 Brzezinski et al. ........ 358/1.13
5,829,033 A * 10/1998 Hagersten et al. .......... 711/141
5,881,262 A * 3/1999 Abramson et al. .......... 712/216

\* cited by examiner

*Primary Examiner*—Pierre-Michel Bataille
(74) *Attorney, Agent, or Firm*—Troutman Sanders LLP; Gerald R. Boss; James Hunt Yancey, Jr.

(57) ABSTRACT

An apparatus (11) causes invalid data to be read again from a memory device (12, 13) before being read by a device (10). A transaction queue (22) stores pending and dispatched device transactions, the queue includes an input for receiving (21) transactions, an output for dispatching (26) transactions, a pointer for pending transactions, and a pointer for dispatched transactions. A master controller (42) responds to an invalid data signal by preventing the transaction queue from dispatching pending transactions to the memory device, by causing the transaction queue to dispatch again the device read transaction which resulted in the invalid data and, subsequently, by causing the data which was read again from the memory device to be accepted by the destination device, by setting the dispatched transaction pointer to the pending transactions pointer, and by enabling the transaction queue to dispatch pending transactions to the memory device.

20 Claims, 3 Drawing Sheets

RETRY OF A DEVICE READ TRANSACTION

BACKGROUND

Typical memory systems may execute memory read transactions and memory write transactions. On occasion, an error may occur on a memory read transaction. High performance memory controllers, such as may be in servers, may rely on data redundancy schemes, such as error correction codes (ECC), to provide fault tolerance and correction for errors. These schemes may work satisfactorily where the corruption of the data is limited. However, some errors may cause such great corruption of the data that these schemes may not work; that is, the errors may be uncorrectable. If the error is due to a "stuck-at" or hardware failure fault, where a memory cell, buffer or some other component has suffered a permanent failure, then the data may be obtained from another source, if available, such as a mirror server or memory. However, a mirror server or memory is not feasible in some applications. If the data cannot be corrected or obtained from another source, then the corrupted data may still be provided to the requesting program. This corrupted data may simply cause an erroneous output from the program, may cause the requesting program or a program utilizing the corrupted data to crash, or may cause the operating system to crash.

DETAILED DESCRIPTION

Figure 1:
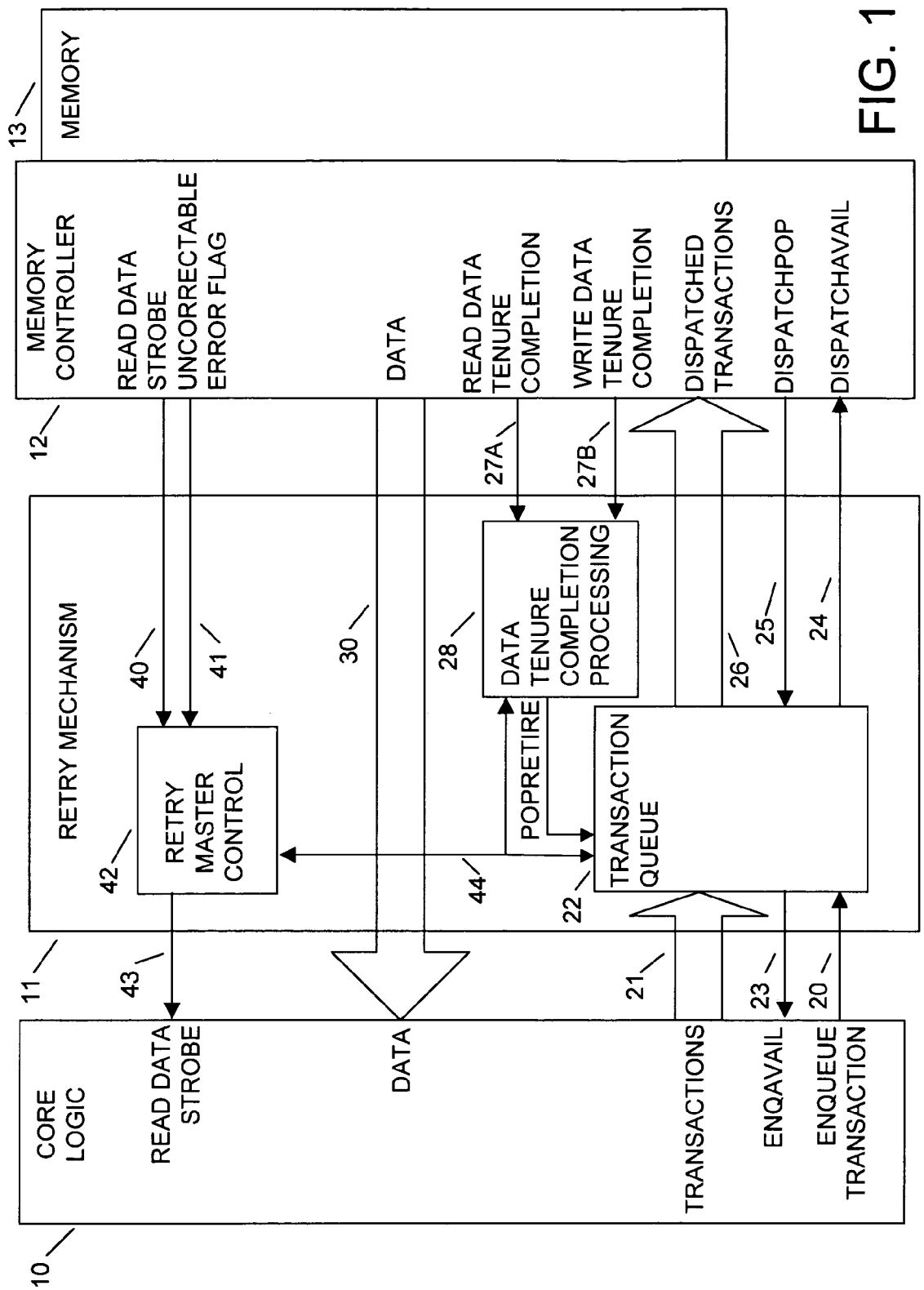
FIG. 1 is a block diagram of an embodiment of the present invention.

FIG. 1 is a block diagram of an embodiment of the present invention. When a memory location is read and there is an uncorrectable error in the data read from that location, corrective action may need to be taken.

Some errors may be transient errors such as may be caused by noise or by a collision on a data bus, and are not stuck-at faults. If the data is uncorrectable because of transient errors then valid data may be obtained by simply executing that read transaction again, that is, reading that memory location again. Valid data may then be provided to a data utilization or destination device, such as core logic 10, which may contain or interface with a program or programs requesting data.

A problem that may arise when a transient error occurs may be that if there is a subsequent write transaction to that memory location, executed before the read transaction is performed again, then the original data may be, and likely will be, destroyed. Thus, although the data appears to be valid, it is not the original data and therefore may have the same effect (wrong result, program crash, operating system crash) as corrupted data.

Some receiving processes need data in the order requested, so data from subsequent memory read transactions, that is, memory read transactions which occurred after that erroneous memory read transaction, may need to be discarded. Also, as data may be read again from the memory location which resulted in the erroneous data, then data in that memory location should be protected, so subsequent write transactions to that memory location may need to be disabled. Further, if data from subsequent memory read transactions are discarded, then those memory locations may need to be protected so they may be read again, so subsequent write transactions to those memory locations may need to be disabled.

The memory location which resulted in the erroneous data may then be read again and, regardless of whether the data from that memory location is still erroneous, the data from that memory location may be provided to the requesting process, the appropriate subsequent memory locations may be read again, the subsequent data may be provided to the requesting process and, write transactions to those memory locations may be enabled or re-enabled. Thus, upon detection of an uncorrectable error, the associated data in the memory may be preserved until it can be read again, and then the requested data and other data may be provided to the requesting process.

If the error was due to a transient, such as noise, the second read attempt may produce valid data. However, if the error was due to a stuck-at fault, such as the data at that memory location actually being corrupted, then the second read may again produce erroneous or invalid data. Thus, an infinite loop may need to be prevented from occurring when the data in the memory location is actually corrupted. This may be accomplished by creating a record that the data has been read once and found to be erroneous, such as by setting a bit. Then, when the data is read again, if the bit has been set, the data may be provided, and the record may be cleared, regardless of whether the data is valid or not. Thus, there will be two attempts to read the data from a memory location. However, this is a design choice, and a counter or register may be used to keep such a record, and some other number of attempts may be used, for example, three or four, which may be desirable in noisy locations or in environments where there are frequent data bus collisions. However, more attempts may result in more delay in sending data to the core logic 10.

For convenience of discussion, "erroneous memory location" means the memory location from which the data was read, and does not mean that the location was erroneous, or that the data in the memory was necessarily erroneous, but means that the data, as received by the memory controller 12, was erroneous and uncorrectable.

It is convenient to first consider a memory transaction in which there are no errors. The core logic 10 may contain or may interface with the process, device or system requesting the read or write memory transaction. When a memory transaction is desired, the core logic 10 may send the desired transaction to the retry mechanism 11 which, in turn, may send the desired transaction to the memory controller 12 which, in turn, may cause the memory 13 to execute the desired transaction, reading or writing the data. If data is being read, then the memory 13 may send the data to the memory controller 12 which, in turn, sends the data to the retry mechanism 11 which, in turn sends the data to the core logic 10 for use by the requesting process.

The retry mechanism 11 may comprise a transaction queue 22, a data tenure completion processing unit 28, and a retry master control 42. The transaction queue 22 may contain several pending memory transactions. When a memory transaction is desired, the core logic 10 may signal that transaction to the transaction queue 22 via the "ENQUEUE TRANSACTION" signal 20. The transaction queue 22 or the retry master control 42 may then make a determination whether another transaction should be accepted. This determination may be based upon available space in the queue 22, whether a retry procedure is in process, or any other desired criteria. If the transaction may be accepted then the transaction queue 22 may send the "ENQAVAIL" signal 23 back to the core logic 10 and, in return, the corelogic 10 may send the desired transaction or transactions 21 to the transaction queue 22. If the transaction queue has pending transactions, then the transaction queue 22 may then signal the memory controller 12 that a memory transaction is desired via the dispatch available ("DISPATCHAVAIL") signal 24. The memory controller 12 may then send the "DISPATCHPOP" signal 25 to the transaction queue 22, which may cause the transaction queue 22 to pop a pending transaction and send the transaction 26, which then becomes a dispatched transaction rather than remaining as a pending transaction.

To prevent data from being inadvertently overwritten, the retry master control 42 and/or the transaction queue 22 may monitor for incoming write transactions. If an incoming transaction is to the same address as a previous, and not yet completed transaction, then the incoming transaction is held in abeyance until the previous transaction has been completed. Once that previous transaction has been completed then the transaction held in abeyance may be dispatched. Also, to provide for data from read transactions to be provided in the order requested, all incoming transactions, or at least all incoming write transactions, subsequent to the transaction held in abeyance may be held in abeyance.

In some memory systems and subsystems, memory read and write transactions include an allocated time, or tenure, for an address or command, and an allocated time, or tenure, for the data associated with the address or command. Address and/or command tenures may be on busses that are common or shared with data tenures, or the address and/or command tenures may be on separate busses. When a tenure is complete, the associated bus may be released for the next transaction. However, numerous issues, including but not limited to multiple independent memory channels, divergent read and write cycle timings, and divergent data pipeline handling, cause variations in data tenure completion. The transaction queue 22 does not know how long it will take for the transaction to occur so the transaction may be maintained in the transaction queue 22 until a data tenure completion signal 27A, 27B is provided.

The memory controller 12 may then send the memory transaction information to the memory 13 for execution. Once the memory 13 executes the memory transaction the memory controller 12 may send a "READ DATA TENURE COMPLETION" signal 27A or a "WRITE DATA TENURE COMPLETION" signal 27B to the data tenure completion processing unit 28. This may be used to indicate that the read/write tenure has now elapsed. The unit 28 may then send a "POPRETIRE" signal to the transaction queue 22, which may be used to advise the queue 22 that the popped transaction has been completed and may be retired. If the controller 12 has not asserted the uncorrectable error flag, then the retry master control 42 may allow the queue 22 to act upon the POPRETIRE signal, so the queue 22 may remove ("retire") that memory transaction from the transaction queue 22 if all previous pending transactions have been retired. If any previous pending transaction has not been retired then the current transaction may not be retired. This is in case a previous pending transaction eventually results in an uncorrectable error condition and, in that case, that previous pending transaction, and subsequent transactions, may need to be performed again.

If the dispatched memory transaction was a read transaction the memory 13 may send the data to the memory controller 12, which may then test the data for errors. If the data is not erroneous then the memory controller 12 may send the data 30 to the core logic 10 and may send a "READ DATA STROBE" 40 to a retry master control 42. The retry master control 42 may then send a data available signal, such as the "READ DATA STROBE" 43, to the core logic 10. In response to the strobe 43, the core logic 10 may accept the data 30 for processing. Thus, the core logic 10 has now received and accepted the requested data.

The data may be stored in the memory 13 using an error correction code (ECC) of some sort. If a correctable error is found when the controller 12 is testing the data then the controller 12 corrects the data before sending it on to the core logic 10.

Consider now that an uncorrectable error has occurred. That is, the memory controller 12 has found that the data is corrupted and cannot be recovered using the ECC. The memory controller 12 may then send an UNCORRECTABLE ERROR FLAG 41 to the retry master control 42. This may be used to instruct the retry master control 42 to begin the data recovery procedure and not to send the read data strobe 43, even if the read data strobe 40 is also present. The retry master control 42 may also prevent the data tenure completion processing unit 28 from sending the POPRETIRE signal, or may cause the transaction queue 22 to ignore the POPRETIRE signal. The retry master control 42 may then cause the transaction queue 22 to disable write transactions to the erroneous memory location. This preserves the data in the erroneous memory location so that it can be read again. The retry master control 42 may also cause the transaction queue 22 to disable write transactions to the subsequent memory locations to preserve the data at those memory location so that this data can be read again once the data from the erroneous memory location has been read again.

Figure 2:
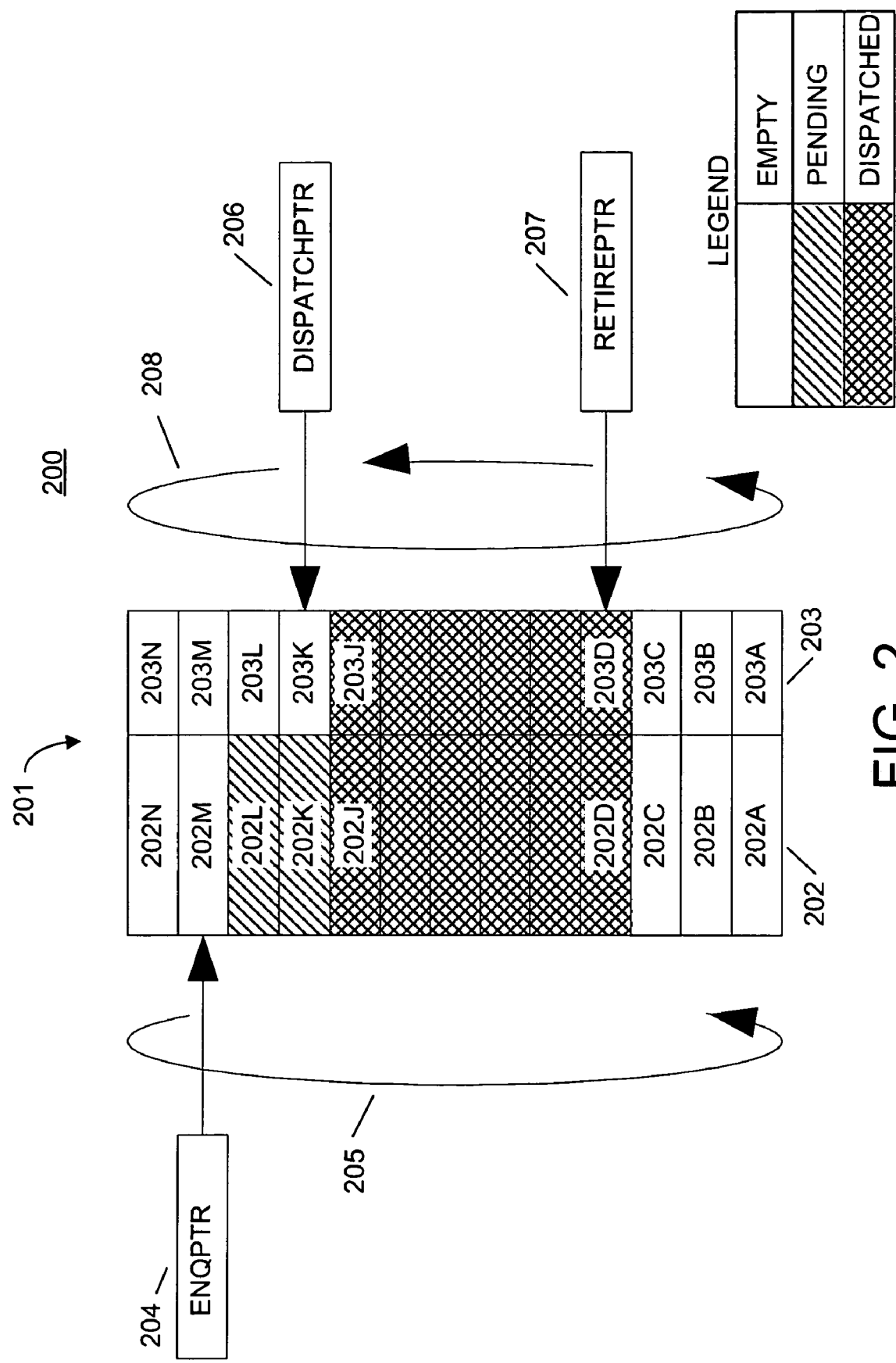
FIG. 2 is a diagram of the queue mechanism of the transaction queue of an embodiment of the present invention.

Turn now to FIG. 2 which is a diagram of the queue mechanism of the transaction queue 22 of an embodiment of the present invention. The queue mechanism 200 may have a circular or rotary table 201 which may have a plurality of rows A through N and thus a queue size ("QSIZE") of N, may have a transaction attribute column 202, and may have a Common Access Method (CAM) function column 203, and each column 202, 203 may have a corresponding plurality of entries 202A–N and 203A–N, respectively. The CAM function column 203 may be the CAM function of the address attribute on READ transactions which have been dispatched.

An "ENQPTR" pointer 204 points to the next location in table 201 where the incoming transaction may be placed for execution. The ENQPTR pointer 204 may move generally incrementally, as shown by line 205, from the bottom of the table (row A) to the top of the table (row N), and may then return to the bottom of the table again. A "DISPATCHPTR" pointer 206 may point to the next pending transaction in table 201 that will be dispatched to the memory controller 12, and may also move generally incrementally, as shown by line 208, from the bottom of the table to the top of the table, and then return to the bottom of the table again. Finally, a "RETIREPTR" 207 may point to the oldest transaction in table 201 that has been dispatched to the memory controller 12, and may also move generally incrementally, as shown by line 208, from the bottom of the table to the top of the table, and then return to the bottom of the table again. The movement of the pointers is a design choice and could be, if desired, in the reverse direction.

Thus, the next incoming transaction may be placed, if at all, in the location in the queue specified by the ENQPTR pointer 204; the next transaction to be dispatched to the memory controller 12 may be read from the location in the queue specified by the DISPATCHPTR 206 pointer; and the RETIREPTR 206 may specify the next transaction to be treated as completed and therefore retired, thereby making that location empty and available for a subsequent incoming transaction. In the example shown, ENQPTR 204 is pointing to row M; DISPATCHPTR 206 is pointing to row K; and RETIREPTR 207 is pointing to row D. Thus, rows K and L have transactions in them which are pending, that is, they have not been dispatched to the memory controller; rows M through C are currently empty; and rows D through J have been dispatched to the memory controller and are awaiting a signal that the tenure for these transactions has elapsed or that these transactions have been completed.

The ENQAVAIL flag signal 23 signal may indicate whether any space is available in the queue to accept another transaction. As such, the relationship "QSIZE−|(ENQPTR−RETIREPTR)|" may be tested, keeping in mind the circular or rotary nature of the table 201. If the relationship is greater than zero then space may be available, and if the relationship is zero then space may not be available. The situation "less than zero" should not occur as it means that an unexecuted transaction has already been overwritten.

The DISPATCHAVAIL flag signal 24 may be used to indicate whether there is a transaction in the queue which is available for dispatch to the memory controller 12. If the DISPATCHPTR 206 is pointing to an address which shows a CAM function from a dispatched READ transaction, then there may be an address collision so, even if ENQPTR 204 is greater than DISPATCHPTR 206, then a transaction may not be available. If there is not an address collision, and if ENQPTR 204 is greater than DISPATCHPTR 206, then a transaction may be available.

Finally, the RETIREAVAIL signal may indicate whether there are transactions which have been dispatched, but not yet completed. If ENQPTR 204 is greater than RETIREPTR 207 then the RETIREAVAIL signal flag may be true.

If a data tenure completion signal 27A, 27B is present, and if the data tenure completion signal is the same type (READ, WRITE) as the type of the transaction (READ, WRITE) pointed to by the RETIREPTR 207, then the RETIREPTR 207 may be popped and incremented.

If not, a DEFERREDREADPOP counter (not shown) may be used to keep count of the number of outstanding (dispatched, not yet retired) READ transactions. So, if the RETIREPTR is pointing to a READ transaction and the DEFERREDREADPOP counter is greater than zero then the RETIREPTR 207 may be popped and incremented, and the DEFERREDREADPOP counter may be decremented.

Likewise, a DEFERREDWRITEPOP counter (not shown) may be used to keep count of the number of outstanding (dispatched, not yet retired) WRITE transactions. So, if the RETIREPTR is pointing to a WRITE transaction and the DEFERREDWRITEPOP counter is greater than zero then the RETIREPTR 207 may be popped and incremented, and the DEFERREDWRITEPOP counter may be decremented.

Finally, if the READ data tenure completion signal 27A is present then the DEFERREDREADPOP counter may be incremented, or if the WRITE data tenure completion signal 27B is present then the DEFERREDWRITEPOP counter may be incremented.

As a consequence, when read data tenure completion (27A) for the oldest dispatched read transaction occurs and there is an uncorrectable error for the data for that oldest dispatched read transaction, then:

if a PREVIOUSERROR flag (not shown) has been set to indicate that an uncorrectable error has previously occurred for that memory location then the uncorrectable error may be ignored, the PREVIOUSERROR flag may be cleared, and normal processing may be resumed;

if the PREVIOUSERROR flag has not been set, then the RETIREPTR may be inhibited so no additional transactions may be dispatched to the memory controller;

the read data for that oldest dispatched read transaction may be discarded, data tenure completions (27A) for subsequent outstanding dispatched read transactions may be discarded and the data from those subsequent read transactions may be discarded;

write transactions are inhibited;

the DISPATCHPTR 206 may be set to the value of the RETIREPTR 207 (thus reverting the process back to the oldest dispatched read transaction);

the PREVIOUSERROR flag may be set to indicate that an uncorrectable error just occurred for that memory location; and normal processing may be resumed, starting with another attempt to read the data requested by that oldest dispatched read transaction.

When a read data tenure completion (27A) for the oldest dispatched read transaction occurs and there is not an uncorrectable error for the data for that oldest dispatched read transaction, then the PREVIOUSERROR flag may be set.

It will be noted that write transactions are not dispatched until previous pending read transactions have been successfully completed or retried. This prevents the overwriting of data which may need to be read again in the course of a retry procedure.

Some transactions can complete data tenures out of order for various reasons, but they should still be retired strictly in order for the requesting program. For example, multiple data tenure completions may happen concurrently or even out of order (in a different order than the order in which they were requested). As a consequence, additional read data storage may be needed if read data tenures can be completed out of order with respect to other, prior dispatched, read transactions. The retry mechanism 11 may thus process data completion tenures and generate a pop/increment signal for the RETIREPTR.

The read transaction retry mechanism 11 thus may provide for autonomous recovery of transient uncorrectable read faults. Also, except for those cases which are extremely time-sensitive and for which a delay caused by a retry attempt may be a problem, neither the memory controller 12 nor the core logic 10 are aware of the process, so the recovery attempt is transparent. The retry mechanism 11 preserves the read data and the read data ordering, and augments server reliability and maintainability by discarding data which is momentarily corrupt and by then providing valid data. Finally, the retry mechanism 11 also provides for handling of out-of-order data tenure completions, even when a data error occurs.

Figure 3:
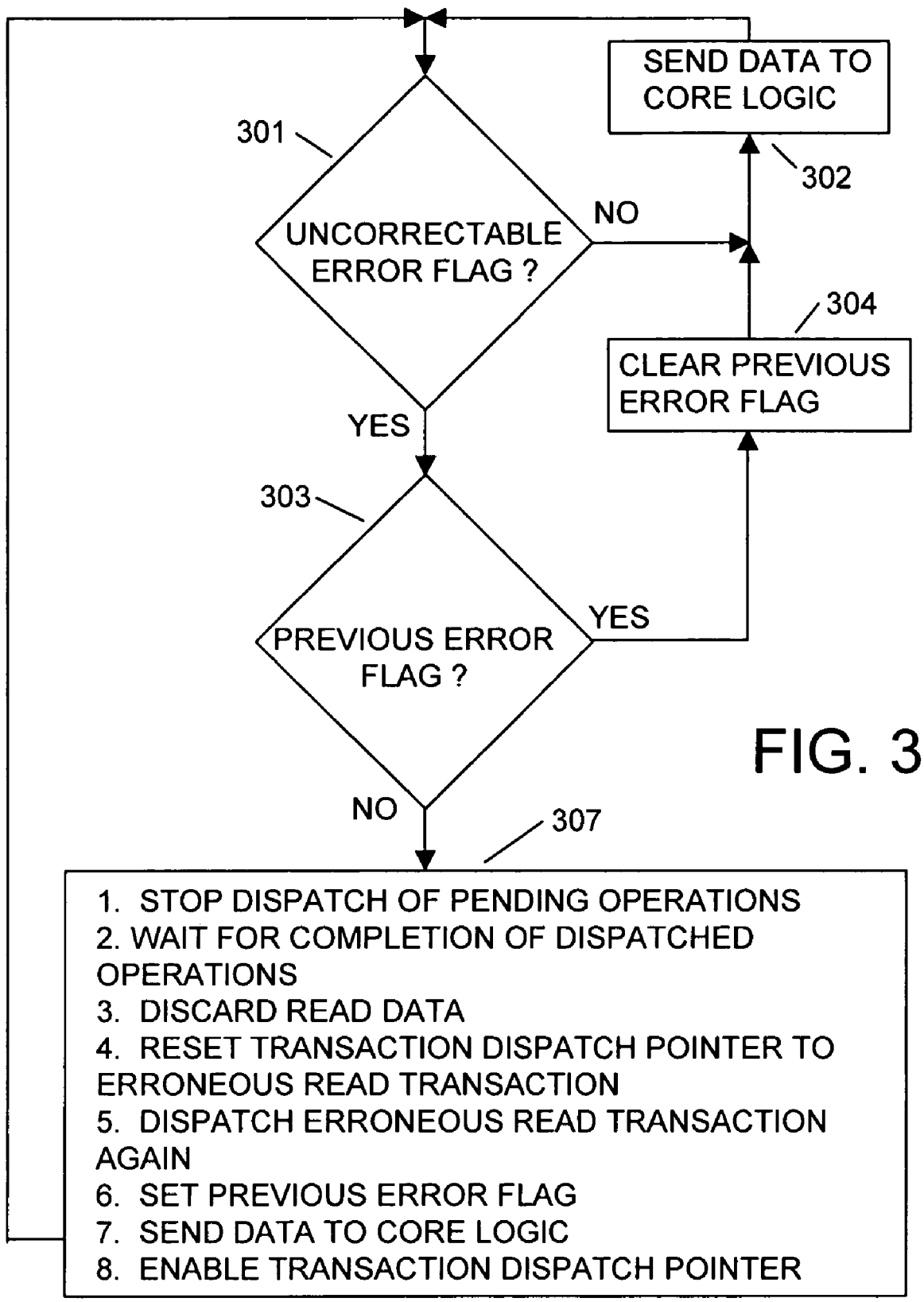
FIG. 3 is a flow chart of an operation of the present invention.

Turn now to FIG. 3 which is a flow chart of an operation of the present invention. Operation may begin after a read data strobe 40 is received. Test 301 may be for the assertion or presence of the uncorrectable error flag 41. If the uncorrectable error flag 41 is not present then the data may be sent 302 to the core logic. However, if the uncorrectable error flag 41 is present then test 303 may be for the assertion or presence of the previous error flag. If the previous error flag is present then the previous error flag may be cleared 304 because this is a subsequent attempt to read the data but the data is still erroneous, and so the data may be sent 302 to the core logic.

If the previous error flag is not present then this may be the first attempt to read the data, and the data was erroneous, so the retry procedure may be implemented.

Process 307 may halt the dispatch of pending operations, may wait for the completion of dispatched operations, may discard the previously read data, may reset the transaction dispatch pointer to the erroneous read transaction, may dispatch the read to that memory location again, may set the previous error flag, may send the newly read data from that memory location to the core logic, and may then enable the transaction dispatch pointer, so that the previously-dispatched, but now pending, transactions may be dispatched again. A return may then be made to test 301. Thus, in accordance with process 307, the data may be read again and then, regardless of whether 301 the data is still uncorrectable or not, the data may be sent 302 to the core logic.

Thus, when the controller 12 provides the data read from memory locations subsequent to reading the erroneous memory location the data will be not be read by the core logic 10 because the read data strobe 43 has not been provided by the master control 42. Therefore, the data in those memory locations must be preserved so that they can be read again after the data from the erroneous memory location has been read again. Accordingly, the master control 42 will then cause the transaction queue 22 to disable pending write transactions to those memory locations. The retry master control 42 will then cause the queue 22 to send a memory read transaction to the controller 12 for the erroneous memory location and those subsequent memory locations. Once the controller 12 has delivered the data for the erroneous memory location then the master control 42 will cause the transaction queue 22 to enable pending write transactions to that memory location, including any write transactions that have been held in abeyance.

In addition, as each subsequent memory read transaction is processed and the data from a memory location is determined to be valid, subsequent write transactions to those memory locations are enabled.

Therefore, in the event that the data read from a memory location is erroneous and uncorrectable, further write operations to the erroneous memory location are disabled until the data is read again from that memory location. Once the data is read again, then write operations to the erroneous memory location are enabled. Similarly, if the data read from a memory location is erroneous and uncorrectable then subsequent data reads from other memory locations are not provided to the core logic 10. Rather, the data is read again from the erroneous memory location, that data is provided to the core logic 10, and then the subsequent data from the other memory locations are provided to the core logic 10.

Other methods and details of operation, both exclusive and non-exclusive, are also possible and contemplated. For example, master control 42 can provide the erroneous memory location address to queue 22, and queue 22 can defer any pending transactions for that memory location, or master control 42 can obtain a list of queued transactions from queue 22, store any pending transactions for that erroneous memory location, and then cause queue 22 to delete those pending transactions from queue 22, or the retry master control 42 may simply cause the transaction queue 22 to disable all pending write transactions until the erroneous memory location and any other necessary memory locations have been read again. The retry master control 42 communicates with the transaction queue 22 via a bus, line, or lines 44.

Further, an optional read data cache (not shown) may be provided between the data output of memory controller 12 and the data input of core logic 10. The read data cache may be used to reduce the delays caused by a read retry because most of the cached data may not need to be read again. That is, only the erroneous memory location may need to be read again, and the data from that subsequent attempt will be placed in the proper location in the data cache so as to preserve the order of the data which has been read and which is to be provided to the core logic 10.

If cache 31 is present then the data from certain memory locations has already been read, determined to be valid, and is waiting to be delivered to the core logic 10. Therefore, the transaction queue 22 can write data to those memory locations without affecting the validity of the data from those locations. However, in order to preserve the requested order of delivery of the data, the retry master control 42 will not provide the read data strobe 43 to the core logic. Thus, when the controller 12 provides the data read from memory locations subsequent to reading the erroneous memory location the data will be not be read by the core logic 10. Therefore, the data in those memory locations will be preserved by the cache 31 so that they can be provided to the core logic 10 after the data from the erroneous memory location has been read again and provided. The retry master control 42 will then cause the queue 22 to send a memory read transaction to the controller 12 for the erroneous memory location. Once the controller 12 has delivered the data for the erroneous memory location then the master control 42 will cause the transaction queue 22 to enable subsequent write transactions to that memory location and will begin providing the read data strobe 43 to the core logic for the erroneous memory location and subsequent memory locations.

The retry mechanism 11 may be implemented in hardware, software, or a combination of hardware and software. Further, the retry mechanism 11 may be a separate stand-alone circuit or may be part of the memory controller 12, may be part of the core logic 10, or may have some components or features in the memory controller 12 and other components or features in the core logic 10. The core logic 10 may be, but is not limited to being, a processor another component, subsystem or system which requests read and/or write transactions. Although one environment of the present invention is for use with a core logic circuit and a memory controller circuit, the present invention is not so limited and may be used in any situation where it is desirable or preferable to read data again instead of sending corrupted data. Also, while one environment is with respect to uncorrectable data from a memory, the present invention may be used whenever invalid data has been obtained and it is desired to attempt to obtain valid data. Further, while an embodiment has been described wherein the memory controller 12 attempts to correct the data from the memory before sending an uncorrectable error flag, the memory controller 12 may simply check the data and send an uncorrectable error flag without attempting to correct the data from the memory. While an embodiment and its environment have been described above and shown in the accompanying figures, the present invention is not so limited as various modifications may occur to those of ordinary skill in the art upon reading this disclosure. The scope of embodiments of the invention should, therefore, be determined with reference to the appended claims, along with the full scope of equivalents to which such claims are entitled. Further, it is emphasized that the Abstract is provided to comply with 37 C.F.R. §1.72(b) requiring an Abstract that will enable the United States Patent and Trademark Office and the public generally to determine quickly from a cursory inspection the nature and gist of the technical disclosure. It is submitted with the understanding that, in accordance with 37 C.F.R. §1.72(b), the Abstract will not be used to interpret or limit the scope or meaning of the claims.

I claim:

1. An apparatus, comprising:
    a transaction queue to store pending device transactions and dispatched device transactions, the queue including an input for receiving transactions, the queue including an output for dispatching transactions to a device, the device transactions including device read transactions and device write transactions; and
    a controller coupled to the transaction queue and responsive to an invalid data signal for a device read transaction to prevent the transaction queue from dispatching a pending transaction to the device, to cause the transaction queue to dispatch again the device read transaction which resulted in the invalid data signal such that a memory location is accessed more than once to obtain valid data and, subsequently, to send to a desired destination a data available signal for the data which resulted from the device read transaction which was dispatched again, and to enable the transaction queue to dispatch a pending transaction to the device.

2. The apparatus of claim 1 wherein the controller is further responsive to the invalid data signal to determine if invalid data read from the device location has occurred previously and, if not, to then cause the transaction queue to dispatch again the device read transaction which resulted in the invalid data signal and, subsequently, to send to a desired destination a data available signal for the data which resulted from the device read transaction which was dispatched again, and to enable the transaction queue to dispatch a pending transaction to the device.

3. The apparatus of claim 1 wherein the controller is further responsive to the invalid data signal to determine if invalid data read from the device location has occurred previously and, if so, then to send to the desired destination a data available signal for the data which resulted from the device read transaction which resulted in the invalid data signal.

4. The apparatus of claim 1 and wherein the controller is further responsive to the invalid data signal to cause intervening data to be cleared, intervening data being data which was read from device locations other than that device location which produced the invalid data and which was read between the time data was read from that device location and the time data was read again from that device location, and then, after causing the data which was read again from the device to be sent to the desired destination, to cause the data to be read again from device locations which were read between the time data was read from that device location and the time data was read again from that device location and, subsequently, to send to the desired destination a data available signal for the data which was read again from those device locations.

5. The apparatus of claim 1 and wherein the transaction queue further includes first pointer for pending transactions and a second pointer for dispatched transactions, and the controller is further responsive to the invalid data signal to cause the second pointer to assume the value of the first pointer.

6. The apparatus of claim 1 wherein invalid data is data which has an uncorrectable error.

7. An apparatus, comprising:
    a memory device to read and write data in response to device transactions, the device transactions including device read transactions and device write transactions;
    a data utilization device to accept data in response to a data available signal;
    a memory controller, coupled to the memory device and to the data utilization device, to accept data from the memory device, to check the data for an error, to provide an invalid data signal if the data has an error, and to provide the data from the memory to the data utilization device;
    a transaction queue, coupled to the memory controller, to store pending device transactions and dispatched device transactions, the queue including an input for receiving transactions, the queue including an output for dispatching transactions to the memory controller; and
    a master controller, coupled to the memory controller, the transaction queue and the data utilization device, and responsive to an invalid data signal for a device read transaction to prevent the transaction queue from dispatching a pending transaction to the memory controller, to cause the transaction queue to dispatch again the device read transaction which resulted in the invalid data signal such that a memory location is accessed more than once to obtain valid data and, subsequently, to send to the data utilization device a data available signal for the data which resulted from the device read transaction which was dispatched again, and to enable the transaction queue to dispatch a pending transaction to the memory controller.

8. The apparatus of claim 7 wherein the master controller is further responsive to the invalid data signal to determine if invalid data read from the device location has occurred previously and, if not, to then cause the transaction queue to dispatch again the device read transaction which resulted in the invalid data signal and, subsequently, to send to the data utilization device a data available signal for the data which resulted from the device read transaction which was dispatched again, and to enable the transaction queue to dispatch a pending transaction to the memory controller.

9. The apparatus of claim 7 wherein the master controller is further responsive to the invalid data signal to determine if invalid data read from the device location has occurred previously and, if so, then to send to the data utilization device a data available signal for the data which resulted from the device read transaction which resulted in the invalid data signal.

10. The apparatus of claim 7 and wherein the master controller is further responsive to the invalid data signal to cause intervening data to be cleared, intervening data being data which was read from device locations other than that device location which produced the invalid data and which was read between the time data was read from that device location and the time data was read again from that device location, and then, after sending to the data utilization device a data available signal for the data which was read again from that device location, to cause the data to be read again from device locations which were read between the time data was read from that device location and the time data was read again from that device location and, subsequently, to send to the data utilization device a data available signal for the data which was read again from those device locations.

11. The apparatus of claim 7 and wherein the transaction queue further includes first pointer for pending transactions and a second pointer for dispatched transactions, and the master controller is further responsive to the invalid data signal to cause the second pointer to assume the value of the first pointer.

12. The apparatus of claim 7 wherein the memory controller, after checking the data for an error, is further operative to attempt to correct the invalid data and, if the invalid data cannot be corrected, then to send the invalid data signal.

13. A method, comprising:
   receiving an indication that data read from a device location is invalid;
   if invalid data read from the device location has occurred previously then sending a valid data signal for the data to a desired destination; and
   if invalid data read from the device location has not occurred previously then:
      inhibiting write operations to the device;
      reading the data in that device location again such that the data in the device location is accessed more than once to obtain valid data; and
      enabling write operations to the device and sending to a desired destination a valid data signal for the data which resulted from reading that device location again.

14. The method of claim 13 and, prior to inhibiting write operations,
   if invalid data from that device location has not occurred previously then proceeding with inhibiting write operations, reading the data again, enabling write operations and sending the valid data signal.

15. The method of claim 13 and:
   if invalid data read from the device location has not occurred previously then setting a previous error flag to indicate that invalid data read from that device location has occurred previously; and
   if invalid data read from the device location has occurred previously then clearing the previous error flag to indicate that invalid data read from that device location has not occurred previously.

16. The method of claim 13 in which invalid data is data which has an uncorrectable error.

17. A method, comprising:
   receiving an indication that data read from a device location is not valid;
   inhibiting write operations to the device;
   reading the data from that device location again such that the data in the device location is accessed more than once to obtain valid data; and
   enabling write operations to the device and sending to a desired destination a valid data signal for the data which resulted from reading that device location again.

18. The method of claim 17 and, prior to inhibiting write operations,
   if invalid data from that device location has not occurred previously then proceeding with inhibiting write operations, reading the data again, enabling write operations and sending the valid data signal.

19. The method of claim 17 and:
   if invalid data read from that device location has not occurred previously then setting a previous error flag to indicate that invalid data from that device location has occurred previously; and
   if invalid data read from that device location has occurred previously then clearing the previous error flag to indicate that invalid data from that device location has not occurred previously.

20. The method of claim 17 in which invalid data is data which has an uncorrectable error.

\* \* \* \* \*